United States Patent [19]

Marcy

[11] 4,448,361

[45] May 15, 1984

[54] SELF-LOADING BALE DISINTEGRATING MACHINE

[76] Inventor: Dewey R. Marcy, 3430 - 13th St., Greeley, Colo. 80631

[21] Appl. No.: 484,210

[22] Filed: May 23, 1983

Related U.S. Application Data

[63] Continuation of Ser. No. 227,991, Jan. 23, 1981, abandoned, which is a continuation-in-part of Ser. No. 146,447, May 5, 1980, abandoned.

[51] Int. Cl.3 ..................... B02C 13/08; B02C 13/286

[52] U.S. Cl. .............................. 241/101.7; 241/186.2; 241/186.4

[58] Field of Search ............ 241/27, 30, 101 A, 101.7, 241/186 R, 186.2, 186.4, 189 R, 189 A

[56] References Cited

U.S. PATENT DOCUMENTS

| | | | |
|---|---|---|---|
| 3,979,074 | 9/1976 | White et al. | 241/30 |
| 3,999,674 | 12/1976 | Meitl | 241/101 A |
| 4,082,198 | 4/1978 | Anderson et al. | 241/101.7 |
| 4,088,272 | 5/1978 | Grillot | 241/30 |
| 4,094,428 | 6/1978 | White et al. | 241/101 A |
| 4,106,706 | 8/1978 | Burrows | 241/186.2 |
| 4,364,526 | 12/1982 | White | 241/186.4 |

OTHER PUBLICATIONS

"Hay Buster, Big-Bale Buster"-by Hay Buster Mfg. Inc.

*Primary Examiner*—Mark Rosenbaum
*Assistant Examiner*—Timothy V. Eley
*Attorney, Agent, or Firm*—Schmidt, Johnson, Hovey & Williams

[57] ABSTRACT

The machine has a normally upright, open top, rotary tub provided with a high speed, disintegrating rotor below the floor of the tub that projects through an opening in the floor to progressively reduce the mass of crop materials into disintegrated form as the tub rotates to agitate the mass. The disintegrating rotor serves also as a means for blowing and forcibly projecting the disintegrated materials out a discharge spout as disintegration occurs, without the aid of an intermediate conveyor or the like. The tub is mounted on a wheeled chassis in such a manner that it can be tipped essentially ninety degrees from its normal operating position to a lowered position in which the top of the tub is essentially vertically disposed, thereby permitting the tub to scoop up and load into itself a mass of materials as the machine is backed toward and into the materials. After then swinging the tub back up to its operating position, the mass may be transported by the machine to a desired site for disintegration, whereupon rotation of the tub and activation of the rotor commences the disintegration process.

14 Claims, 9 Drawing Figures

SELF-LOADING BALE DISINTEGRATING MACHINE

This is a continuation of application Ser. No. 227,991 filed on Jan. 23, 1981, now abandoned, which itself is a continuation-in-part of Ser. No. 146,447, filed May 5, 1980, now abandoned.

BACKGROUND OF THE INVENTION

This invention relates to agricultural produce material rotating tub grinders, and more particularly to livestock hay and such feed grinders.

Hay, after being cut and dried in windrows in the field, is usually baled today in the form of large heavy round bales, weighing from 900 to 2000 pounds each. Those bales are stacked in the field for later use. Sometimes the hay is baled as smaller hay bales, or even just piled in a haystack or pile. To avoid waste the farmer grinds the hay in the field into small pieces by a suitable grinder, for feeding his livestock, and then he transports the ground hay to a suitable bin for later feed use. That grinding is usually done by a rotating grinder operable by power from a tractor. Such heretofore conventional grinders have a horizontal flat floor with a rotor grinder mill in an opening in the floor. Such grinders have heretofore been inefficient due to defects in their construction and operation, which has resulted in a mass of the hay bridging in the tub grinder, during the operation of grinding on the floor and causing a stalling disruption of operation. That bridging mass would pile up against the grinder and prevent the grinder from efficient operation in the flat floor. To overcome such bridging or blocking heretofore various devices and methods have been endeavored to cure the defects, such as by lessening the size of the grinder in the floor only to a portion of the radius of the rotating tub as the machine is operated which would cause only a part of the material therein to contact the grinder, and some of it would as a result be left unground in the center of the tub. Further, heretofore large heavy iron floor fins have been fastened to the floor in an effort to cause the hay moved thereagainst on the inside of the tub on the floor to be directed toward the rotor grinder in the floor, and such heavy fins were expensive to make and needlessly heavy of construction and machine operation, requiring more power input from the tractor than otherwise needed, with a resultant loss of grinder power and efficiency. Thus there has been a continuing need for a lighter and more efficient and less expensive to make machine grinder, in the form of operable tub grinders in the industry, and to grind large heavy bales.

Further, there heretofore has been complicated methods of inserting the hay or other fibrous material to be ground into the rotating tub, such as by separate conveyors, or manual labor, resulting in a loss of manpower and the need of extra expensive adjunct loader conveyors and machinery.

Also in the industry heretofore, after the rotating grinder chopped the fibrous material, by its rotor in the floor, then there has been an extra conveyor required thereunder to convey the chopped material to a desirous point. Such an extra conveyor was needed to deposit the ground material in a pile or in an elongated rib of the material, when it was used to feed cattle in the field, for example.

In the use of such heretofore rotating hay grinders used to grind modern round heavy 900–2000 pound bales of hay, there is insufficient power available when used with older tractors, manufactured about ten years or more ago, to operate the heretofore known grinders to cut up such heavy bales, and because of the inefficiency of the grinder used. Those old tractors, while still operable and useable, did not produce sufficient R.P.M. at the power take-off, 540 such R.P.M. to operate their grinders efficiently mainly because of the wasted power required to operate such inefficient machines. Heretofore, rotor grinders used rotating knife cutter-type blades, wherein the longitudinal edge of each cutter blade contacted the hay and pulled and broke the hay up and literally did not properly cut it, because of too much cutting edge. The machine of this invention is, among others, adaptable for use with the older just mentioned weaker 540 R.P.M. PTO take off tractors, because the rotating grinder of this invention has been simplified in the form of smaller longer end edge cutter hammer-blade-blowers, and so is adaptable for use not only with 100 horsepower of not over 540 R.P.M. PTO tractors, but as well with more powerful modern tractors.

This invention for the first time, as far as known, has perfected a rotor cutter grinder consisting of a plurality of broadside blades with each blade end as a sharpened cutter edge, for clean cutting of the hay strands by the shorter end edge cutters, and with less power being required to operate the rotor cutter because of the smaller end cutter edges width of the rotor blades, each being of substantially less cutter edge by several times than the overall longitudinal length cutting edge as heretofore previously used in rotor cutters.

SUMMARY OF THE INVENTION

This invention is an improved horizontally rotatable tub grinder machine having a rotatable tub wall, on a stationary one plane sloping acute angle to the horizontal floor, and with an improved rotor hammer mill in the sloping floor, in the form of end cutter chopper-blower blades. The floor opening, having the rotary grinder, is substantially equal to the radius of the rotatable tub. The heretofore used heavy iron floor fins secured on the upper surface of the flat floor have been eliminated. The hay within the rotatable tub by this invention is moved by the rotatable tub wall and fluffed up and down by the hay movement over sloping angle floor of this invention, as will be explained. I have perfected a rotor chopper-blower, with broadside solid flat end cutter-propeller blades in the improved construction of my novel rotor. Each blade is slightly end concave, in the direction of its rotation at its outer end, and each outer broadside end of the blade is a sharpened flail knife and cutter edge. The cutter end edges of each of my blades cut the material on rotor revolution into smaller pieces, and said blades do not drag the material uncut down into the rotor floor opening, as heretofore in the industry. Further, also, the concave end portion of each of my blades acts as a suitable fan blade to propel the air within the involute housing of the rotor as a blower propeller turbine and thereby blow deliver the cut material by an air blast therefrom. I have thus eliminated the need of a separate conveyor to take the cut material out of the rotor housing. That rotor housing is formed as an involute blower housing, in combination with my novel end cutter rotor knives, for efficient rotor cutter-blower operation.

I have for the first time, as far as known, perfected individual flail end edge cutter knives of my rotor to act also as blower blades, as well as end edge cutter knives, by the end edge of each flail being a cutter and also that end being concave to form a fan type solid blade. Thus a separate conveyor under the rotor is eliminated.

I secure my machine to a farm tractor by means of a standard three-point hitch hook-up, and because of my light construction an old type 540 R.P.M. older tractor may be used as sufficient for supplying the power take off. However, modern tractors with as high as 1000 R.P.M. PTO, are also useable for the purpose.

I have perfected a novel self-loading method of feeding the forage material into the rotating tub, without the need of a conveyor or otherwise to place the material therein, by pivotally mounting the rotating tub and its stationary floor on a secondary frame as a unit on the machine main frame structure. When desired to load my grinder, I pivot the tub and its floor as a unit, on a horizontal pivot by a hydraulic power means from the tractor, so as to tip them as a unit from the horizontal position into a vertical position, and in that vertical position the tractor is used then to push the entire tub and its floor horizontally against a quantity stack of hay desired to be placed therein. That hay can be baled or a loose stack. I provide a suitable fork secured in prolonged alignment with the wall of the tub onto the periphery of the tub, to assist in the scooping up of the hay into the tub, as illustrated. When the tractor pushes the device, with the tub so tilted against the hay sufficiently to fill the tub, then the tractor operator uses the hydraulic power means to repivot the rotating tub and its floor as a unit with the hay therein back into the horizontal position on the frame, for operational horizontal chopper machine operation. Material to be ground may be otherwise loaded into my rotatable grinder machine tub, without pivoting the tub and floor unit, to scoop same therein, as that could be done within the spirit of this invention.

By the use of this improved machine a self-loading of hay to be ground can be accomplished, as explained, and thus another piece of equipment is eliminated, such as a machine to load the hay into the tub. My grinder machine can be used to self-scoop-load hay which is frozen, loose, egg-shaped or otherwise baled or loose stacked, by the pivotal tipping of the tub and floor unit to accomplish that loading, and then pivotally re-tilting the unit to the horizontal. So far as known, this tilting-scooping tub self-loading principle has not been known or used heretofore, in the rotor machine tub grinding of fibrous farm material industry.

An object of this invention is to have an acute angle to the horizontal fixed single plane sloping floor for a rotatable tub fibrous material grinder machine, without any floor material guide fins fixed on the floor, and having a rotor grinder in an opening of the floor, whereby upon each tub revolution on that sloping floor, the fibrous material within the tub is thereby effectively rolled and stirred up and down by the sloping floor upon each tub revolution.

Another object of this invention is to provide such a grinder machine having a one-plane fixed sloping floor, at the bottom of a rotatable walled tub, without any fixed floor fins on the floor, and having a rotor grinder in a radial opening of the floor positioned between the uppermost and lowermost points of the sloping floor, and in which the rotatable operation of the tub is adapted to effectively cause the fibrous material within the tub to be stirred and to be fed into the rotor grinder.

Another object, in such a rotating tub grinder machine, is to provide a rotor grinder blower in the form of a plurality of solid broadside placed rotating chopper-blower flail blades positioned in an involute blower housing, with the end of each flail blade formed of concave cup-like formation in the direction of the revolution of the rotor, and with each end edge of the blade sharpened as a knife to effectively end blade edge chop the material striking the rotor, and with said rotor chopper operating by its blades in said housing also effectively comprising a blower for blowing the material cut by the rotor out of the housing, upon rotor operation of the solid concave individual end edge cutter blades in said involute housing.

Another object of this invention is to provide such an improved tub grinder machine, with a rotor having rotating end edge cutter knife-blower flails positioned in an opening in the floor of said tub, and in which the rotating flail rotor blades extend adjustably above the plane of the adjacent opening substantially upwards to three inches, whereby the operation of the rotor flails cut the material contacting the rotor flails on tub rotation during operation of the machine in cut size pieces in proportion to the flail operation extension above the opening plane.

Another object of this invention is the provision of such an improved rotating tub grinder machine, in which the roughage material within the rotating tub is chopped by the machine, and whereby the rate at which said material is fed to and chopped by said improved rotor chopper-blower is controlled by the speed of the rotating tub.

Another principal object of this invention is the provision of the rotating grinder tub and its fixed one plane sloping floor as a unit adapted to be pivotally tipped, from its upright normal operable horizontal position, to a 90° vertical position, and in such vertical position is adapted to be scoop pushed against a quantity of fibrous material, such as baled hay, for the scoop self-loading of such material into the tub, and then adapted to be tipped back into horizontal position with the hay in the tub for grinding the material so scooped into the tub.

Another object of this invention is to provide such a rotatable tiltable-scoopable tub, in a rotating tub grinder machine having, a fixed slanting floor, a rotor chopper-blower in an opening in the floor and in a delivery involute housing, the provision of a deflector or baffle hood at the outer discharge end of the blower housing for controlling the blown chopped material discharge therefrom, as may be desired either over a broad area or to be confined within a relatively narrow row such as within the standard sized feed bunk upon operation of the machine and drawing the machine along that bunk.

Another object of this invention is to provide such a tiltable self-loading scoopable rotatable tub grinder mechanism, with a fork in peripheral tub wall extension alignment on the periphery of said tub, adapted for fork-like assisting the tub in the scooping action pick up of the material into the tub upon the explained tilting self-loading tub action.

Other and further objects will be apparent to those skilled in the art from the following detailed description and from the drawings as hereinafter explained.

My invention incorporates a novel rotor knife-blower feature, namely, having the substantial outer end edge of each cutter blade concave or cup-like shaped in the direction of rotation of the rotor, and with the rotor in an involute discharge housing. Thus the concave flail knife end edge cutters act as fan blades to create a blower turbine-like action at the same time as being a rotor cutter.

DETAILED DESCRIPTION OF A PREFERRED EMBODIMENT

Figure 1:
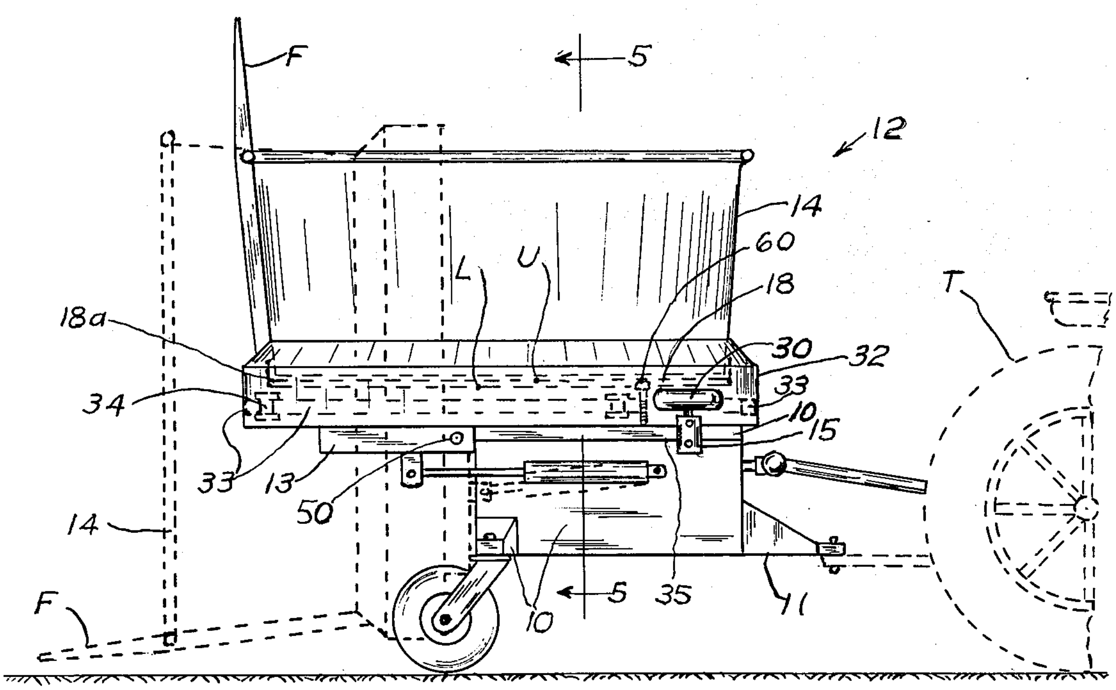
FIG. 1 is a right side elevational view of my rotatable hay grinder machine embodying the principal parts of my invention, as connected to a towing tractor, and with its rotatable tub shown by full lines in horizontal operative position for hay grinding.
Figure 1A:
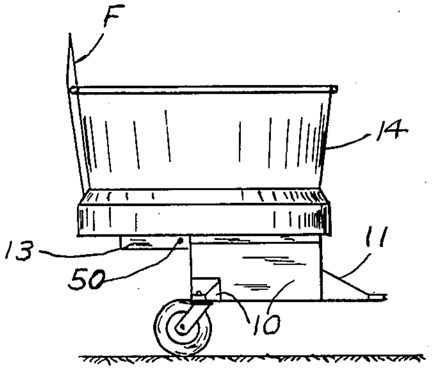
FIG. 1*a* diagrammatically illustrates my machine with its rotatable tub pivoted into horizontal grinder position.
Figure 1B:
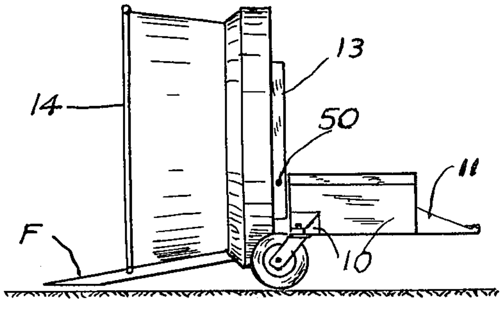
FIG. 1*b* diagrammatically illustrates my machine with its tub pivoted into vertical self-scoop load position.

I provide a two-wheeled chassis having a suitable main horizontal frame 10, having a tongue 11 conventionally attached for towing to and by the tractor T, by a conventional three-point hitch. A secondary horizontal frame 13 is pivotally attached at 50 to and carried on that main frame. On the secondary frame 13 I stationarily provide a one-plane acute angle sloping floor 18, pivotally with the tub secured thereto. The secondary frame has several grooved rollers 34 vertically positioned thereon to carry a peripheral ring or inner tub 14 rib track 33. Rotatable tub 14, has said inner peripheral rib-track 33 at its lower extended inner peripheral edge meshing with the grooved rollers and is mounted on secondary frame 13, so as to be carried by and supported on and by said rollers 34, on said frame 13. The tub 14 is thus rotatable on and carried by those rollers. The tub rotation is caused by a conventional hydraulic drive motor 15, having a rubber tire 31 on drive wheel 30, with tire 31 riding on the lower tub skirt 32. Drive wheel 30 is suitably conventionally hydraulic power operated to thus cause a drive wheel rotation of the tub 14 as shown. Tub 14 outer skirt 32 extends downwardly peripherally in wall continuation of the tub for that purpose. The rotatable tub is approximately eight feet in diameter. An internal wall fin 14*a* is sometimes used to protrude radially from the lower wall portion inwardly of the tub.

A suitable two-wheel supported main chassis 10 is provided, having a tongue 11, suitably connected by a conventional three-point hitch to a towing tractor, indicated as T. The tractor provides conventional power take offs for the machine, by direct drive power to operate the rotor mechanism R, and by hydraulic power to operate hydraulic cylinders adapted to pivotally operate the pivoted rotatable tub 14 and its fixed floor 18 as a unit at pivot 50 as illustrated, and by hydraulic power to run a suitable hydraulic motor 15 for rotating the rotatable cylindrical tub by the motor having a rubber tired wheel 30 frictionally riding against the tub.

A horizontal extension shelf 35 of the secondary frame 13 carries the tub drive motor 15. Wheel 30 driven by motor 15 has its rubber tire 31 riding on the periphery of the lower rotatable wall skirt 32 of tub 14, for thereby rotating the tub. A stationary tub acute angle sloping floor 18 is provided below 14, as a unit therewith on secondary frame 13, and with the floor in an acute angle to the horizontal, for reason to be explained. The rotatable tub 14 and floor 18, as a unit are pivotally carried by the plural spaced-apart rollers 34 meshing against track 33, on chassis 10.

I pivotally mount secondary frame 13 structure, carrying the stationary floor 18 and the tub 14 thereover, by rollers 34 as a unit, on the main wheeled chassis 10 at pivot point 50. A projection 48 extending downwardly from chassis 10 has a suitable pivotally secured double-action hydraulic cylinder 42 connected thereto. Hydraulic cylinder 42 is pivotally secured at the end of its piston arm to a lower projection pivot point under the pivoted secondary frame 13. When hydraulic power from the tractor is applied to one side of the hydraulic cylinder 42, 42 will cause its arm to be withdrawn into its cylinder and thus cause a pivoting of tub 14 and floor 18 by secondary frame 13, as a unit on pivot 50 into the vertical position shown in dotted lines of FIG. 1.

Figure 5:
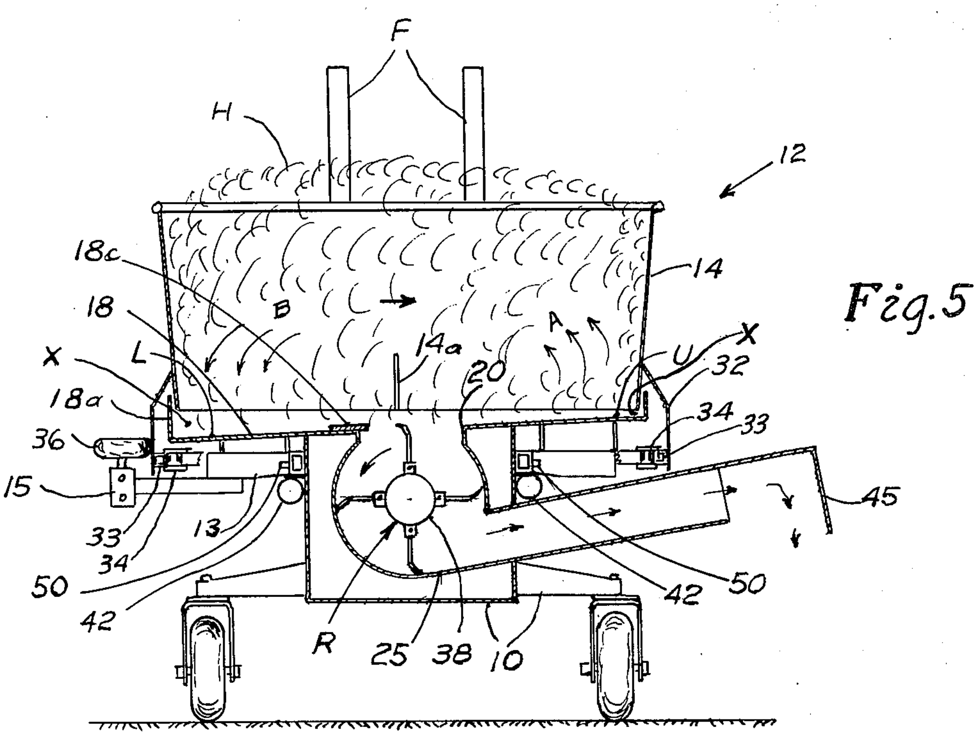
FIG. 5 is a vertical cross-sectional view of the machine, taken on the line 5—5 of FIG. 1 and looking in the direction of the arrows.
Figure 6A:
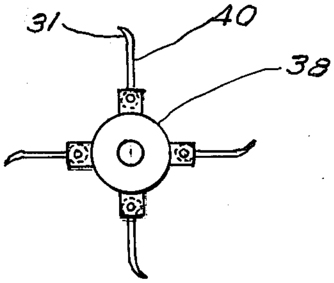
FIG. 6*a* diagrammatically illustrates my rotor flat pivoted flails.
Figure 6:
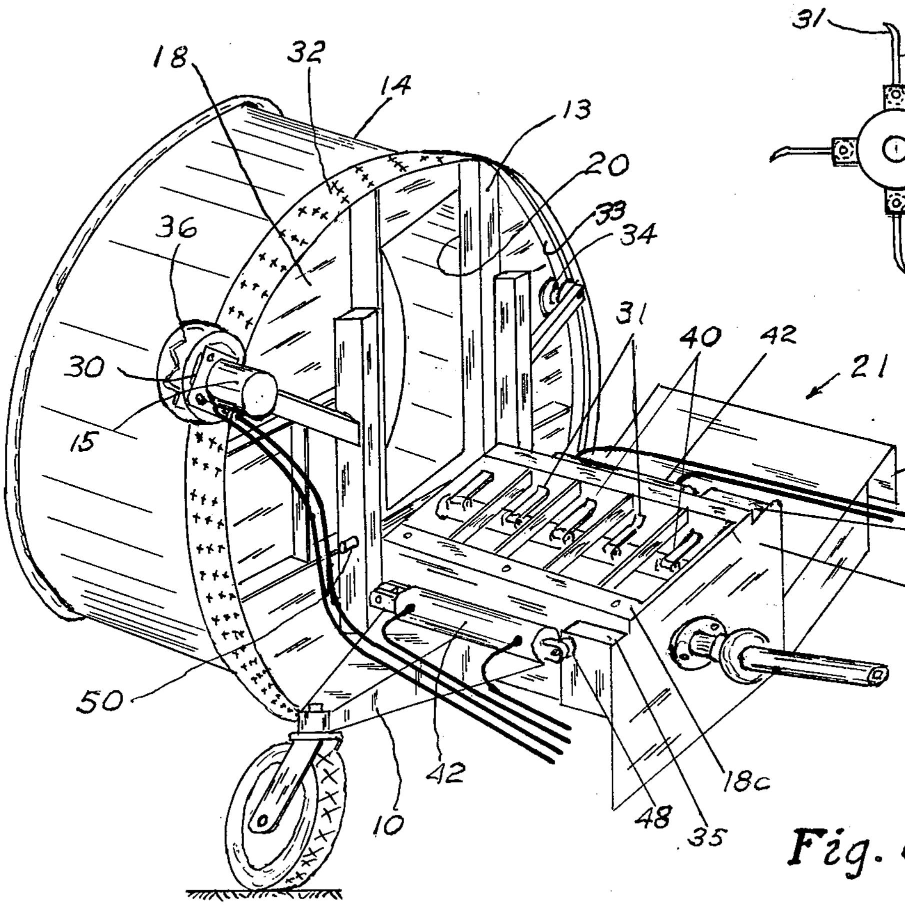
FIG. 6 is a perspective down angle view at the left front side of the machine, as connected at its three-point hitch to a tractor, and is illustrative of the opening in the tub floor in which opening my improved rotor blower is operable when the tub is positioned horizontally and the opening is over the rotor.

My novel rotor grinder mill 21, in radial tub floor opening 20, as illustrated in FIG. 6, consists of a plurality of broadside individual solid flail knife blades 40, each of which at its outer end is slightly concave or cup-shaped and only with the extreme outer flat end 31 edge of each sharpened as a knife. I have a plurality of my flails 40, each replaceably pivotally secured to a rotatable rotor drum 38. Flails 40 are pivotally secured close together on drum 38 and are each positioned broadside to act as an end edge knife-propeller when drum 38 rotates. The pivoting of each flail 40 permits each to project radially from the axis of the rotor 38 on rotor operation. Thus on rotor 38 rotation, counterclockwise as indicated in FIG. 5, each flail 40 is pivotally extended as a spoke and is adapted to cut off hay or forage material striking against its outer end knife edge, and the cut pieces are blown down into the involute rotor housing 25, by the blower action of the rotating individual blades rotating within that housing, as will be explained. It will be seen, as shown in FIG. 5, that the outer ends of the individual cutter blades extend a distance upwardly of three or four inches or less above the plane of the adjacent opening in surface of the floor of the tub when the tub is horizontally thereover. No conveyor is required because the cutter-blowing action of grinder mill 21 is sufficient to blow the cut material pieces from the involute blower housing 25. A deflector hood 45, as illustrated in FIG. 5, is provided, to control direction of the cut material exit, when desired to direct the blown cut material leaving involute housing 25 of the machine into a straight row as the machine is operatively pulled forwardly by the tractor, as, for example, on a feed bunk of a cattle pen, or to direct the material over a larger area, on grinder operation.

Referring to FIG. 6 perspectively is shown my novel rotor R with its individual broadside elongated relatively narrow flail cutter-blower blades 40. I mount each of those blades 40 individually pivotally on the axial rotatable tube means. The axial rotor tube 38, to which flails 49 are each pivotally attached, is power driven to rotate at an R.P.M. of between 500 and 1500. Upon such rotor flail axial rotation operation, each flail broadside blade is thus spun outwardly by shaft 38 rotating force, and thus the outer knife edge of each flail 40 will cut off the fibrous material, such as hay, as may be in the tub and be over the floor radial opening 20. Opening 20 has a framework around and several cross-bars across it as shown. The cross-bars act to prevent an undesirable greater quantity of the hay in the tub from being dropped through opening 20 against the knives than may be desired, as in the case of grinding smaller conventional approximate 18"×36" hay bales in the tub for grinding. A straight bar edge 18*c* is adjustably secured at one longitudinal opening 20 edge, at the side thereof towards which the rotor flail blade ends rotate, and edge 18*c* acts to cause the fibrous material to abut thereagainst as in scissors effect, in the rotor rotation operation cutting of the material, by the ends of the flails, as diagrammatically illustrated in FIG. 5.

The pivoting of the secondary frame 13, with its tub 14 and floor 18 as a unit on its pivot 50 on the main frame, in terms of the horizontal positioning of the opening 20 of the floor 18 over and with relation to the top of the rotor R upper operational action, is controlled, in terms of the distance of that opening 20 over the rotor, by an adjustable means in the form of a lug screw bolt 60 downwardly through the secondary frame 13 onto the main frame 10. When that bolt 60 is extended, it being substantially opposite the pivot point 50, such extension will thus cause a shorter hay chopping of pieces by the upper rotating outer periphery extended edges of the rotor flails in opening 20, on grinder operation as the hay rubs across that opening and against the flails as explained. Larger pieces may be cut, upwards of approximately three or more inches in length, when that adjustable stud bolt 60 is unscrewed in its seat, so as to have the floor with the opening 20 adjacent the flails so that the flail ends extend therethrough sufficiently for that desired longer length cut. In other words, the horizontal pivoting of the unit 14–18, by its secondary frame 13 on its pivot 50, in lower horizontal relationship caused upon withdrawing bolt 60 will cause the rotor to cut the longest pieces, and when bolt 60 is turned down in its seat it will slightly raise the floor on pivot 50 with the floor 20 opening above the rotor and thereby decrease the length of the pieces cut upon rotor operation. The distance of opening 20 in the floor over and above rotor R controls the length of cut of the material. A suitable fork F is attached in extension of the side wall from the periphery of the tub 14, for purpose to be explained.

My one plane stationary sloping acute angle tub floor 18, in fixed floor relationship on the secondary frame 13, is at an acute angle of about 10° to 20° above the horizontal, as illustrated in FIG. 5. Floor 18 extends in that one plane acute angle from one inner side of the rotating tub 14 to the opposite side thereof. Floor 18 has radial opening 20 formed therein. My novel chopper-blower rotor mill 21 is positioned so that on rotation thereof its flails 40 will extend slightly upwardly through that opening 20, when the floor and its tub are in horizontal position, as illustrated in FIG. 5. The uppermost portion of that sloping floor 18 is indicated by the reference character U, and the lowermost portion of 18 by the reference character L.

Figure 2:
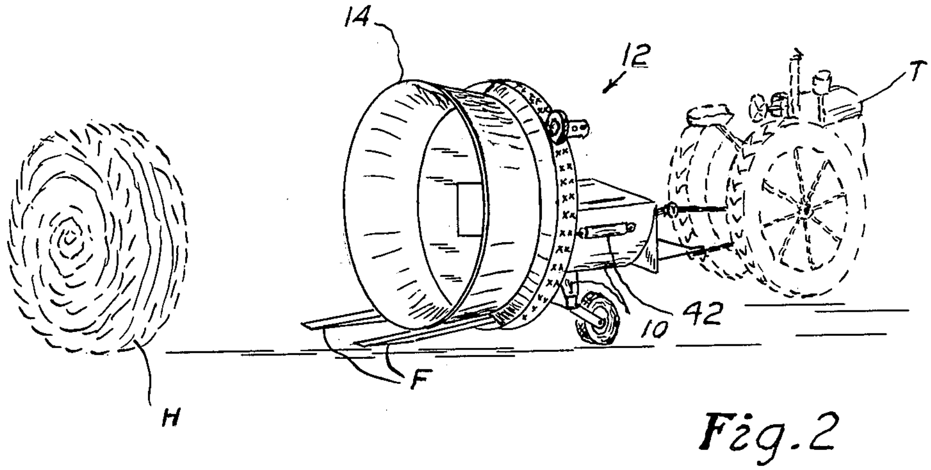
FIG. 2 is a smaller diagrammatic view, with the rotatable tub and its stationary floor pivoted, as a unit, on the main frame to a vertical position, adapting the machine for tub pushing self-loading scooping of hay, in this instance with the hay being a large round bale.
Figure 3:
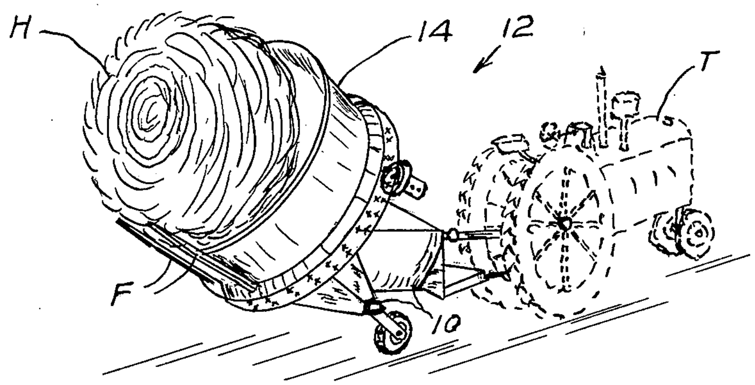
FIG. 3 is a similar view to FIG. 2, but showing the start of pivotal tub unit tilting elevation of the unit, after the hay has been scooped into the tub.
Figure 4:
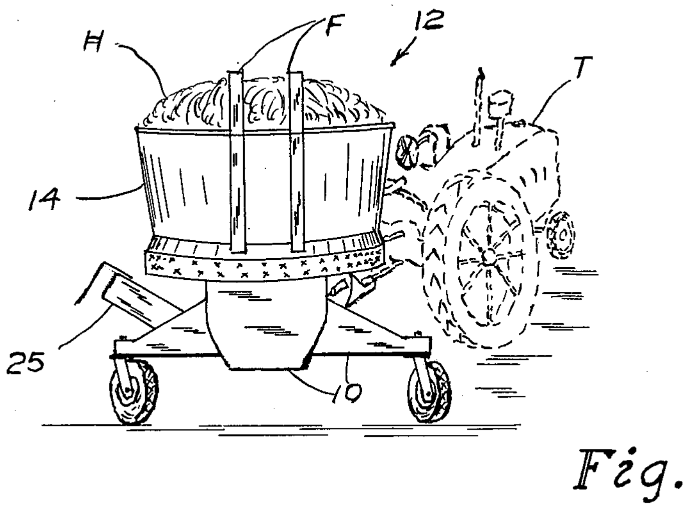
FIG. 4 is a rear end view, after the hay has been scooped into the tub and the tub completely tilted back to the horizonal, with the machine ready to be pulled by the tractor to a given point for horizontal hay grinding operation.

Upon operation of my improved grinder machine 12, with a mass of fibrous bulk material therein, such as a large round heavy bale of hay, as diagrammatically illustrated in FIG. 5, the tub 14 is rotated counter-clockwise by motor 15 in direction of horizontal arrow of FIG. 5, and the rotor-blower mill 21 is operated counter-clockwise, as there illustrated. Then the lower portion of the hay H in tub 14 is chopped as the tub 14 so revolves and mill 21 so operated as the hay is moved by tub 14 over that mill 21. Such hay is first self-scoop loaded into the tub, as diagrammatically shown, by the pivotal scoop operation of the tub, in FIGS. 2, 3 and 4.

During such horizontal grinding operation and tub rotation, the friction of the inner walls of the rotating tub 14, rubbing against the hay therein, causes the hay therein to be moved therein counter-clockwise, in the direction of said arrow in FIG. 5, as viewed downwardly onto the tub, and as so indicated in FIG. 5. Thereupon my new sloping stationary one plane acute angle floor, heretofore described, assists in causing of the hay mass being moved to be raised by such wall friction to the point U on the floor, being the highermost point of that sloping floor, and then to the point L, being the lowermost point of that sloping floor, with each complete revolution of the walls of tub 14. Said one plane acute angle sloping stationary floor 18 and revolving tub walls 14 together act as means for accomplishing that frictional raising and lowering of the mass of the hay H in the tub upon each such tub revolution. That sequential each tub revolution raising and lowering action of the hay mass H just described is diagrammatically illustrated by the arc directional arrows A and B of FIG. 5. To restate, that raising of that bulk mass H of the material to be cut in the tub, is accomplished as that material is moved on the sloping floor up onto the higher point U of the sloping floor 18, as indicated by arrows A, as caused by the friction of the rotating tub wall against that mass, and then that material is so moved down to the low point L of floor 18 by that friction, as indicated by arrows B, which occurs upon and by each revolution of the tub.

That frictional movement of the hay mass, so caused by the combination of the revolving tub on and over said fixed one plane acute angle sloping floor, just described, in addition to the hay mass being raised and lowered on each tub revolution, also causes that mass of hay H within the tub to be "rolled and stirred" or fluffed and kept loose from bridging, upon each tub revolution. With a heretofore rotary tub flat floor machine grinder, there was resultant operational bridging formation of the mass of the material therein, and that problem is now overcome as a result of the novel acute angle sloping floor and rotating tub construction and combination of this invention, just explained.

I provide, with said novel one plane sloping fixed floor, as illustrated in FIG. 5, an upwardly extending fixed peripheral short side wall thereof, 18*a*, therearound, extending vertically upwardly from the periphery of the floor 18, as a cup closely around the lower outer periphery of the rotating wall tub 14. Said short peripheral wall 18*a* prevents a wedging of any portion of the hay mass H in the tub at point X, on the floor under the wall of the tub and as sometimes occurs on grinder operation. On operation of my machine grinder, because of my novel sloping floor 18, each one-half revolution of the tub 14 moves any such wedged material, occurring at point X, on my sloping floor 18 toward and across opening 20 in the floor, where such material crosses over my rotor R, where it is then rotor chopped up. As a result, my sloping floor 18 acts as a self-cleaning means to prevent any wedging accumulation of any material at point X, as occurs heretofore.

My machine can operate successfully without inner tub wall fins 14*a*, as such wall fins 14*a* are not always necessary for successful grinding operation of my machine with materials such as hay and straw. The moving side walls on grinder machine operation normally create sufficient friction against and to cause the bulk of such materials indicated as H in the tub to be moved with and by the rotating tub side walls up to the high spot U of the floor and then down to the low spot L of the floor, upon each revolution of the tub 14, as explained.

I diagrammatically illustrate how the mass H of hay within the tub, upon each tub revolution operation, is raised on the floor 18, as indicated by arrows A, during the first half of each revolution to the higher floor point U, and then how the mass H is lowered within the tub on the floor 18 during the second half of each tub revolution to the lower floor point L as indicated by the arrows B. That raising and lowering is repeated upon each single revolution of the tub, as a result of my novel fixed sloping one plane acute angle floor combination with the rotatable tub walls, thus thereby frictionally effecting such rolling and stirring of that mass upon each raising and lowering of the mass H as just explained. That raising and lowering or rolling and stirring action of mass H just explained, is substantially directly proportional to the acute angle of that one plane sloping fixed floor to the horizontal, meaning, increasing that angle to approximately 30° from the horizontal would be the means for substantially increasing the up and down automatically caused rolling and stirring of the mass H within the tub, as heretofore explained, during machine grinding operation of the mass. Conversely, for example, decreasing the angle of that acute one plane fixed floor down, substantially to a 10° acute approximate angle from the horizontal, would lower the extent of that up and down automatic caused raising and lowering and stirring and rolling action of the mass H within the tub on that slanting floor, during machine grinding operation. The greater that angle of the fixed floor the more input power would be required from the power source of the attached tractor vehicle, from which power my machine is operated, at a given speed of tub 14 rotation, from the suggested acute floor sloping angle shown as heretofore of approximately 20° from the horizontal, and the lesser that angle then the less power input would be required. As illustrated, I have found the usual rate of speed of rotation of the tub 14, for normal hay grinding operation by my machine, would be about 10 revolutions per minute. I prefer to provide the tub 14 with its wall as a slight outer sloping wall, and that wall in cooperation with my novel acute angle fixed sloping floor comprises the friction means for "rolling and stirring" and raising and lowering and fluffing of the mass H within the tub, upon grinder operation and the tub wall rotation, as explained.

It will be understood that many changes and modifications may be made within the preferred embodiment of my invention heretofore illustrated and described in detail, within the spirit, scope and teaching and intent of this invention, and therefore I wish only to be bound by the hereunto appended claims.

What I claim and desire to secure by Letters Patent is:

1. A self-loading machine for disintegrating and discharging a mass of crop material comprising:

a mobile chassis having a pair of opposite ends with respect to a normal path of travel thereof;

a container on said chassis having an internal mass-receiving area bounded at lateral extremities by normally generally upwardly projecting, mass confining agitator means, said confining agitator means being rotatable as a unit about a normally generally upwardly projecting axis passing through said mass-receiving area, and the container having an open entry mouth to said area defined by normally uppermost, end extremities of said confining agitator means;

apparatus associated with the container for disintegrating and discharging a mass of material contained therein as said confining agitator means is rotated to agitate the mass after the latter is loaded into said receiving area;

means mounting said container for fore-and-aft tipping movement relative to the chassis between a raised, disintegrating position and a lowered, self-loading position in which the confining agitator means projects generally horizontally with a lower portion thereof generally adjacent the ground and said axis of rotation extending generally parallel to said path of travel, said container being configured for slipping said confining agitator means under and around the mass to scoop the same into said mass-receiving area in a self-loading action upon shifting of the chassis toward the mass along said path of travel with the container lowered and said mouth thereof leading; and means for effecting said movement of the container between said disintegrating and self-loading positions.

2. A self-loading machine as claimd in claim 1, wherein said apparatus is mounted against travel with the container during said movement of the latter, said container having an opening therein disposed to communicate the mass-receiving area thereof with said apparatus when the container is in said raised, disintegrating position.

3. A self-loading machine as claimed in claim 2, wherein said container includes a floor movable with the confining means between said raised and lowered positions, said opening being in said floor.

4. A self-loading machine as claimed in claim 3, wherein said floor is provided with means holding the same against rotation with said confining means.

5. A self-loading machine as claimd in claim 3, wherein said opening in the floor is positioned to provide viewing access to an aft end of the machine and the mass being picked up when the container is in its lowered position.

6. A self-loading machine as claimed in claim 1, wherein the chassis and the container are provided with a pivot therebetween, said tipping movement being about said pivot.

7. A self-loading machine as claimed in claim 1, wherein said apparatus includes a discharge spout for directing a stream of the disintegrated material from the machine while the latter is advancing along its path of travel.

8. A self-loading machine as claimed in claim 1, wherein said apparatus includes a rotor situated below said container when the latter is in said raised position thereof for receiving materials from the container, said rotor having a housing about the same provided with a discharge spout for receiving disintegrated materials projected thereinto by the rotor.

9. A self-loading machine as claimed in claim 8, wherein said rotor is operable about an axis of rotation generally parallel with said path of travel and is provided with means for coupling the same with a power take off shaft of a towing vehicle.

10. A self-loading machine as claimed in claim 1, wherein said confining means is provided with fork means projecting outwardly beyond said normally uppermost extremities thereof for assisting in slipping under mass during loading thereof.

11. A self-loading machine as claimed in claim 10, wherein said container is provided with a fluid pressure operated rotary motor for driving the confining means about said axis of rotation, said motor being coupled with the container for movement therewith between said positions whereby to permit rotational positioning of said fork means when the container is in said loading position thereof.

12. A self-loading machine as claimed in claim 1, wherein said confining means comprises a continuous, circumferentially extending wall.

13. A self-loading machine as claimed in claim 1, wherein said container is provided with a fluid pressure operated rotary motor for driving the confining means about said axis of rotation.

14. A self-loading machine as claimed in claim 1, wherein said means for effecting movement of the container between said positions includes a fluid pressure piston and cylinder assembly connected between the chassis and the container.

* * * * *